Oct. 27, 1964    L. J. BERTELE    3,154,628
WIDE ANGLE OBJECTIVE
Filed May 15, 1961    4 Sheets-Sheet 1

Inventor:
Ludwig Jakob Bertele
By Baldwin & Wight
Attorneys

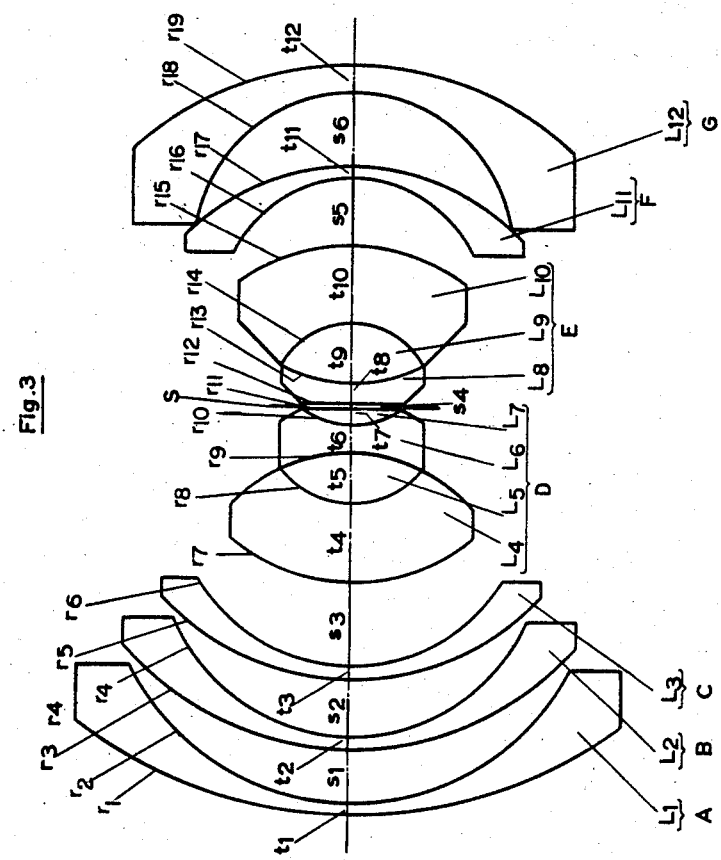

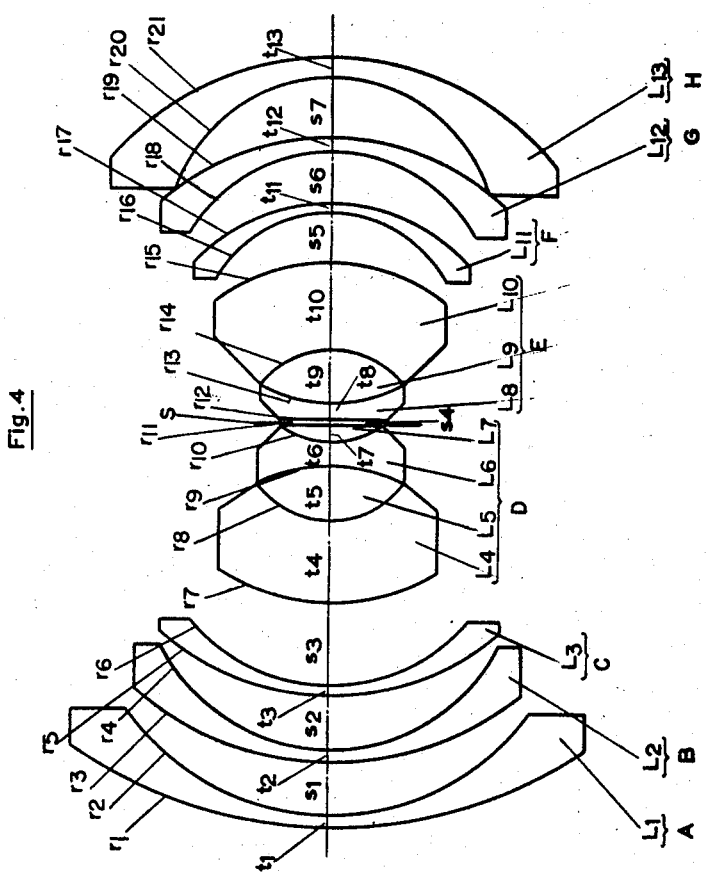

3,154,628
WIDE ANGLE OBJECTIVE
Ludwig Jakob Bertele, Heerbrugg,
Sankt Gallen, Switzerland
Filed May 15, 1961, Ser. No. 110,251
Claims priority, application Switzerland, Jan. 28, 1956,
29,426
3 Claims. (Cl. 88—57)

The invention relates to wide angle objectives and its object is to increase the angular field beyond 90° in a known type of objective which consists of two converging components, preferably each made up of a plurality of individual lenses, which are enclosed at both object and image sides by at least two menisci with concave faces towards the said converging components. As a rule the menisci are of diverging power. The diaphragm and usually also the shutter are located in the small air space separating the two converging components. The air space can also be omitted by combining the two converging components into a single converging component in so far as the inseration of a diaphragm is dispensed with.

It is known that with increasing angular field the extent of light reduction towards the edge of the image becomes of increasing importance. This can be recognized in a simple manner by considering an objective with front diaphragm. A beam inclined at 60° to the optical axis provides on the corresponding part of the image surface an illumination intensity only one-sixteenth of that provided by a beam on the optical axis. With use of specially constructed lens combinations located in front of the diaphragm at the object side, including that referred to above, the virtual image of the diaphragm viewed from the object side, i.e., the entrance pupil, with increasing angle of observation to the optical axis is imaged in a constantly increasing magnitude, which is equivalent to an increased passage of light for the obliquely arriving rays.

In order, however, that the light gained in this way should be turned to account not only from the point of view of illumination but also from that of forming an image, the correction of the aberrations, above all coma, must be very carefully carried out on account of the beams of wide aperture. In these efforts it is found that parts of the obliquely incident beams of medium inclination are unsatisfactorily imaged, and in fact those which on entrance into the objective are nearest to the optical axis and on exit therefrom are furthest away.

Detailed investigations have shown that it is possible to overcome this defect if, in accordance with the invention, in the converging component placed at the object side in relation to the middle of the objective there is inserted near the diaphragm a cemented surface of converging power concave towards the diaphragm and having a radius of curvature within the range of $0.10f$ to $0.60f$, where $f$ is the focal length of the complete objective. This effect can be achieved by making the refractive index on the concave side of this surface larger than that on the convex side, i.e., the one facing the object. If there is no diaphragm the plane of narrowest concentration of the beams is to be regarded as the diaphragm in the above definition.

With regard to the course of the sagittal image curve, where there are only two diverging components placed at the object side, it has been found advantageous to give the air spaces measured on the axis such values that the space between the said components lies between the limits of 0.5 and 1.5 times that between the inner component and the adjacent converging components. In an analogous manner the same holds good from the relationship between the corresponding air spaces at the image side.

This application is a continuation-in-part of my application Serial No. 635,361, filed January 22, 1957 (now abandoned).

The accompanying drawing shows several constructional examples of objectives in accordance with the invention, the differences in dimensions being insufficient to be evident in two single figures.

FIGURE 3 is a view similar to FIGURE 1 but showing a third embodiment; and

FIGURE 4 is a view similar to FIGURE 1 but showing a fourth embodiment.

Figure 1:
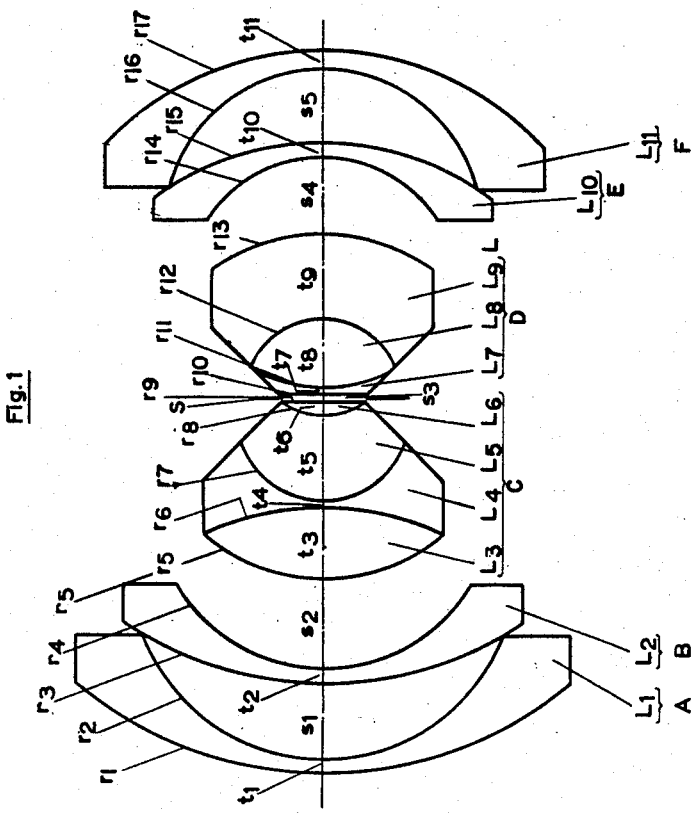
FIGURE 1 is a schematic sectional view of one embodiment of a wide angle objective according to the invention.

In the case of Examples 1 and 2 there are six components designated A to F, FIGURE 1, the component A being at the object side and F at the image side. The first two components A and B are single diverging menisci $L_1$ and $L_2$ concave towards the diaphragm S, which is located between the components C and D. Component C is of converging power and is made up of four individual lenses $L_3$ to $L_6$ all cemented together. The first two cemented surfaces $r_6$ and $r_7$ are convex and concave respectively to the diaphragm. The third cemented surface $r_8$ is the one which is critical for the invention. It is concave towards the diaphragm and has a lower refractive index on the object side than on the image side, so that its acts in a converging manner. The fourth component D is of converging power and is made up of three individual lenses $L_7$ to $L_9$ cemented together, the cemented surfaces $r_{11}$ and $r_{12}$ being convex and concave respectively to the diaphragm. The components E and F are single diverging menisci $L_{10}$ and $L_{11}$ concave towards the diaphragm. Optical data of the two examples are given in the tables hereinafter.

*Example 1.*—The radius of curvature of the cemented surface $r_8$ is 24.8 mm. based on a focal length of the complete objective of 100 mm. The refractive index for the helium $d$-line in front of this surface is 0.02822 less than that behind it. The air space $s_1$ between components A and B is 22.41 mm., and the air space $s_2$ between components B and C is 26.69 mm., so that $s_1$ is 0.84 times $s_2$. The air space $s_4$ between components D and E is 22.29 mm., and $s_5$ between components E and F is 22.24 mm., giving as nearly as possible a ratio of unity. The back focus, i.e., the measurement from the rear surface of the objective to the principle image plane is 37 mm.

*Example 2.*—The radius of curvature of the cemented surface $r_8$ is 26.4 mm. and the refractive index in front of this surface is 0.04756 less than that behind it. The air space $s_1$ between components A and B is 22.28 mm., and the air space $s_2$ between components B and C is 26.35 mm., namely 0.85 times the value of $s_1$. The air space $s_4$ between components D and E is 21.79 mm., and $s_5$ between components E and F is 21.76 mm., again giving a ratio of practically unity. The back focus is 35.9 mm.

Furthermore it is advantageous that the distance between the said cemented surface $r_8$ and the next outer surface directed towards the diaphragm, i.e. surface $r_9$, be chosen smaller than $0.20f$ and larger than $0.01f$ and that at the same time the radius of curvature of the cemented surface $r_{11}$ convex to the diaphragm in the converging component on the image side be chosen greater than that of the said cemented surface in the converging component lying on the object side of the diaphragm, whereby the refractive index on the side of surface $r_{11}$ towards the diaphragm is at least 0.02 smaller than on the image side thereof.

The focal length of each of the converging components adjoining the diaphragm space is larger than $0.30f$ and smaller than $2f$ and the two outer meniscus components always have diverging power of refraction. The axial distance between the single meniscus lenses on both the object and the image sides is larger than $0.04f$ and smaller than $0.60f$. Further examples (3–4 and 5) with the above-mentioned characteristics are described with reference to FIGURES 2, 3 and 4.

*Example 3* (FIGURE 2) shows seven components (A–G), the outer components A and G having diverging power with a focal length of $-2.10f$ and $-2.24f$ respectively. The converging component C on the object side consists of four lens elements and has a focal length of $0.95f$. The converging component D on the image side consists of three single lenses and has a focal length of $0.785f$. The distance between the meniscus lenses A and B is $0.183f$, between E and F $0.12f$ and between F and G $0.185f$. The distance from the cemented surface $r_8$ to the outer surface directed towards the diaphragm is $0.0439f$ with a radius of curvature of $0.248f$. The radius of curvature of the cemented surface $r_{11}$ convex to the same side in the converging component on the image side is greater than $r_8$ by $0.416f$. The refractive index of $L_7$ is 0.06325 smaller than that of $L_8$.

*Example 4* (FIGURE 3) shows seven components (A–G), the outer components A and G having diverging power with a focal length of $-3.34f$ and $-1.67f$ respectively. The converging component D on the object side consists of four lens elements and has a focal length of $0.99f$. The converging component E on the image side consists of three single lenses and has a focal length of $0.802f$. The distance between the meniscus lenses A and B is $0.158f$, between B and C $0.147f$ and between F and G $0.216f$. The distance from the cemented surface $r_{10}$ to the outer surface directed towards the diaphragm is $0.0456f$ with a radius of curvature of $0.258f$. The radius of curvature of the cemented surface $r_{13}$ convex to the same side in the converging component on the image side is greater than $r_{10}$ by $0.458f$. The refractive index of $L_8$ is 0.1215 smaller than that of $L_9$.

*Example 5* (FIGURE 4) shows eight components (A–H), the outer components A and H having diverging power with a focal length of $-3.34f$ and $-2.38f$ respectively. The converging component D on the object side consists of four lens elements and has a focal length of $0.995f$. The converging component E on the image side consists of three single lenses and has a focal length of $0.803f$. The distance between the meniscus lenses A and B is $0.158f$, between B and C $0.147f$, between F and G $0.158f$ and between G and H $0.181f$. The distance to the cemented surface $r_{10}$ from the outer surface directed towards the diaphragm is $0.0456f$ with a radius of curvature of $0.258f$. The radius of curvature of the cemented surface $r_{13}$ convex to the same side in the converging component on the image side is greater than $r_{10}$ by $0.458f$. The refractive index of $L_8$ is 0.1057 smaller than that of $L_9$.

It remains within the scope of the invention if any of the components is made up of individual lenses or if cemented surfaces are introduced. If in one or other component an air layer not substantially influencing the overall performance of the objective and having plane or curved surfaces or with slightly differing curvature at the two sides thereof, a component subdivided in this manner is to be regarded in the sense of the invention as a single component. Also the number of individual lenses constituting the two converging components can be increased or reduced according to optical requirements.

The following tables show the optical data of the examples, and therein the symbols designate the following:

L the individual lenses,
r the radii of curvature of the individual surfaces
t the axial thicknesses of the lenses.
s the air spaces between lenses,
$n_d$ the refractive indices for the helium $d$-line, and
$v$ the Abbe number.

The suffixes denote the particular item in sequence from the object side or front of the objective.

*Example 1*

[Focal length, 100 mm. Aperture ratio, $f/5.6$. Useful angle of field, 120°]

| Lens | Radius of curvature | Thickness or air space | Kinds of glass | |
|---|---|---|---|---|
| | | | $n_d$ | $v$ |
| $L_1$ | $r_1 = +120.25$ | $t_1 = 4.57$ | 1.48749 | 70.3 |
| | $r_2 = +58.43$ | $s_1 = 22.41$ | | |
| $L_2$ | $r_3 = +110.02$ | $t_2 = 3.74$ | 1.48749 | 70.3 |
| | $r_4 = +51.35$ | $s_2 = 26.69$ | | |
| $L_3$ | $r_5 = +56.98$ | $t_3 = 21.80$ | 1.69680 | 55.6 |
| | $r_6 = -86.48$ | | | |
| $L_4$ | $r_7 = +26.78$ | $t_4 = 1.48$ | 1.69680 | 42.1 |
| $L_5$ | $r_8 = +24.80$ | $t_5 = 25.78$ | 1.62588 | 35.6 |
| $L_6$ | | $t_6 = 3.74$ | 1.65410 | 33.8 |
| | $r_9 = +611.23$ | $s_3 = 1.75$ | | |
| $L_7$ | $r_{10} = +2,019.4$ | $t_7 = 1.75$ | 1.58000 | 59.3 |
| $L_8$ | $r_{11} = +44.91$ | $t_8 = 20.17$ | 1.69680 | 55.6 |
| | $r_{12} = -23.46$ | | | |
| $L_9$ | $r_{13} = -58.86$ | $t_9 = 25.46$ | 1.79500 | 27.4 |
| | | $s_4 = 22.29$ | | |
| $L_{10}$ | $r_{14} = -41.33$ | $t_{10} = 3.74$ | 1.51632 | 64.2 |
| | $r_{15} = -84.05$ | $s_5 = 22.24$ | | |
| $L_{11}$ | $r_{16} = -48.52$ | $t_{11} = 4.95$ | 1.51632 | 64.2 |
| | $r_{17} = -90.49$ | | | |

*Example 2*

[Focal length, 100 mm. Aperture ratio, $f/5.6$. Useful angle of field, 120°]

| Lens | Radius of curvature | Thickness or air space | Kinds of glass | |
|---|---|---|---|---|
| | | | $n_d$ | $v$ |
| $L_1$ | $r_1 = +123.05$ | $t_1 = 3.82$ | 1.48669 | 70.4 |
| | $r_2 = +58.56$ | $s_1 = 22.28$ | | |
| $L_2$ | $r_3 = +108.74$ | $t_2 = 3.67$ | 1.43393 | 95.4 |
| | $r_4 = +49.39$ | $s_2 = 26.35$ | | |
| $L_3$ | $r_5 = +56.11$ | $t_3 = 21.22$ | 1.67797 | 55.6 |
| | $r_6 = -83.46$ | | | |
| $L_4$ | $r_7 = +27.17$ | $t_4 = 2.08$ | 1.67756 | 41.6 |
| $L_5$ | $r_8 = +26.40$ | $t_5 = 23.77$ | 1.59225 | 36.2 |
| $L_6$ | | $t_6 = 4.45$ | 1.63981 | 34.7 |
| | $r_9 = +642.44$ | $s_3 = 1.71$ | | |
| $L_7$ | $r_{10} = +3,113.5$ | $t_7 = 2.88$ | 1.57968 | 65.7 |
| $L_8$ | $r_{11} = +43.68$ | $t_8 = 19.01$ | 1.69779 | 55.7 |
| $L_9$ | $r_{12} = -23.29$ | $t_9 = 24.62$ | 1.79491 | 28.2 |
| | $r_{13} = -58.28$ | $s_4 = 21.79$ | | |
| $L_{10}$ | $r_{14} = -39.94$ | $t_{10} = 3.57$ | 1.51054 | 63.3 |
| | $r_{15} = -81.58$ | $s_5 = 21.76$ | | |
| $L_{11}$ | $r_{16} = -46.93$ | $t_{11} = 7.57$ | 1.51054 | 63.3 |
| | $r_{17} = -94.07$ | | | |

Example 3

Figure 2:
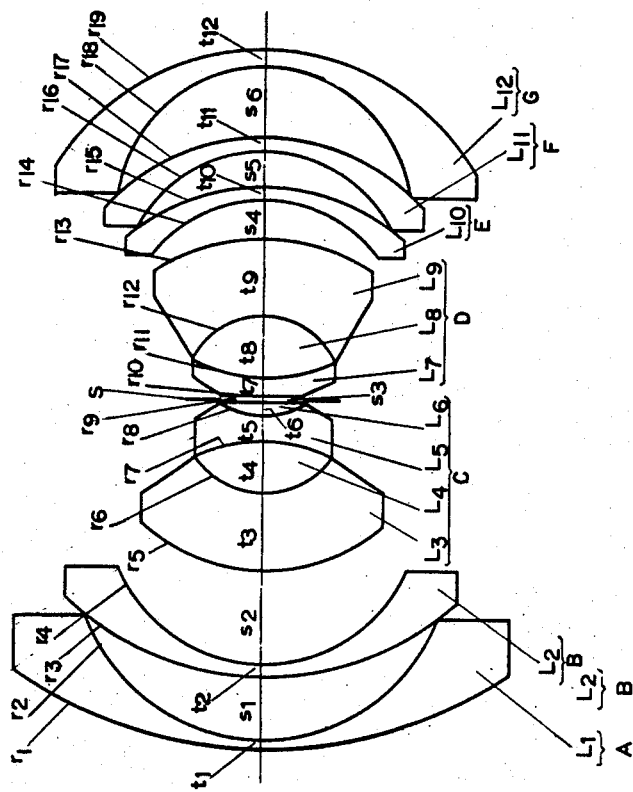
FIGURE 2 is a view similar to FIGURE 1 but showing a second embodiment.

(Figure 2)

[Focal length, 100 mm. Aperture ratio, $f/5.6$. Useful angle of field, 120°]

| Lens | Radius of curvature | Thickness or air space | Kinds of glass | |
|---|---|---|---|---|
| | | | $n_d$ | $v$ |
| $L_1$ | $r_1 = +134.0$ | $t_1 = 3.71$ | 1.48719 | 70.4 |
| | $r_2 = +57.45$ | $s_1 = 18.31$ | | |
| $L_2$ | $r_3 = +87.77$ | $t_2 = 3.81$ | 1.51692 | 64.0 |
| | $r_4 = +47.66$ | $s_2 = 28.34$ | | |
| $L_3$ | $r_5 = +56.86$ | $t_3 = 22.34$ | 1.74444 | 44.9 |
| $L_4$ | $r_6 = +26.97$ | $t_4 = 15.37$ | 1.64734 | 46.3 |
| $L_5$ | $r_7 = -50.13$ | $t_5 = 7.59$ | 1.64910 | 33.7 |
| $L_6$ | $r_8 = +24.82$ | $t_6 = 4.39$ | 1.69908 | 30.1 |
| | $r_9 = +497.6$ | $s_3 = 1.53$ | | |
| $L_7$ | $r_{10} = +363.5$ | $t_7 = 4.63$ | 1.63600 | 43.0 |
| | $r_{11} = +41.61$ | | | |
| $L_8$ | $r_{12} = -25.44$ | $t_8 = 18.45$ | 1.69925 | 49.8 |
| | | $t_9 = 22.31$ | 1.79542 | 28.3 |
| | $r_{13} = -58.54$ | $s_4 = 12.87$ | | |
| $L_{10}$ | $r_{14} = -43.59$ | $t_{10} = 3.49$ | 1.51680 | 54.6 |
| | $r_{15} = -65.39$ | $s_5 = 11.99$ | | |
| $L_{11}$ | $r_{16} = -43.48$ | $t_{11} = 3.49$ | 1.51680 | 54.6 |
| | $r_{17} = -65.41$ | $s_6 = 18.53$ | | |
| $L_{12}$ | $r_{18} = -45.71$ | $t_{12} = 3.27$ | 1.51680 | 54.6 |
| | $r_{19} = -77.49$ | | | |

Example 4

(Figure 3)

[Focal length, 100 mm. Aperture ratio, $f/5.6$. Useful angle of field, 120°]

| Lens | Radius of curvature | Thickness or air space | Kinds of glass | |
|---|---|---|---|---|
| | | | $n_d$ | $v$ |
| $L_1$ | $r_1 = +139.16$ | $t_1 = 3.85$ | 1.48719 | 70.4 |
| | $r_2 = +74.31$ | $s_1 = 15.84$ | | |
| $L_2$ | $r_3 = +91.15$ | $t_2 = 3.96$ | 1.51693 | 64.0 |
| | $r_4 = +57.98$ | $s_2 = 14.71$ | | |
| $L_3$ | $r_5 = +79.22$ | $t_3 = 3.85$ | 1.51692 | 64.0 |
| | $r_6 = +53.64$ | $s_3 = 25.37$ | | |
| $L_4$ | $r_7 = +56.60$ | $t_4 = 23.2$ | 1.78443 | 40.6 |
| $L_5$ | $r_8 = +27.78$ | $t_5 = 15.96$ | 1.64734 | 46.3 |
| $L_6$ | $r_9 = -51.48$ | $t_6 = 7.89$ | 1.65128 | 38.3 |
| $L_7$ | $r_{10} = +25.77$ | $t_7 = 4.56$ | 1.69232 | 30.9 |
| | $r_{11} = +638.2$ | $s_4 = 1.47$ | | |
| $L_8$ | $r_{12} = +2,809.4$ | $t_8 = 6.34$ | 1.57200 | 38.8 |
| $L_9$ | $r_{13} = +45.84$ | $t_9 = 18.06$ | 1.69350 | 48.2 |
| $L_{10}$ | $r_{14} = -24.46$ | $t_{10} = 23.49$ | 1.78472 | 25.7 |
| | $r_{15} = -58.03$ | $s_5 = 20.03$ | | |
| $L_{11}$ | $r_{16} = -40.38$ | $t_{11} = 3.62$ | 1.53113 | 62.0 |
| | $r_{17} = -71.88$ | $s_6 = 21.55$ | | |
| $L_{12}$ | $r_{18} = -47.93$ | $t_{12} = 8.07$ | 1.58913 | 61.2 |
| | $r_{19} = -99.14$ | | | |

Example 5

(Figure 4)

[Focal length, 100 mm. Aperture ratio, $f/5.6$. Useful angle of field, 120°]

| Lens | Radius of curvature | Thickness or air space | Kinds of glass | |
|---|---|---|---|---|
| | | | $n_d$ | $v$ |
| $L_1$ | $r_1 = +139.16$ | $t_1 = 3.85$ | 1.48719 | 70.4 |
| | $r_2 = +74.31$ | $s_1 = 15.84$ | | |
| $L_2$ | $r_3 = +91.15$ | $t_2 = 3.96$ | 1.51692 | 64.0 |
| | $r_4 = +57.98$ | $s_2 = 14.71$ | | |
| $L_3$ | $r_5 = +79.22$ | $t_3 = 3.85$ | 1.51692 | 64.0 |
| | $r_6 = +53.64$ | $s_3 = 25.37$ | | |
| $L_4$ | $r_7 = +58.93$ | $t_4 = 23.2$ | 1.74444 | 44.9 |
| $L_5$ | $r_8 = +27.78$ | $t_5 = 15.96$ | 1.64734 | 46.3 |
| $L_6$ | $r_9 = -51.48$ | $t_6 = 7.89$ | 1.65128 | 38.3 |
| $L_7$ | $r_{10} = +25.77$ | $t_7 = 4.56$ | 1.69232 | 30.9 |
| | $r_{11} = +638.2$ | $s_4 = 1.89$ | | |
| $L_8$ | $r_{12} = +1,091.7$ | $t_8 = 5.09$ | 1.58775 | 42.0 |
| $L_9$ | $r_{13} = +45.84$ | $t_9 = 15.96$ | 1.69350 | 53.4 |
| $L_{10}$ | $r_{14} = -25.70$ | $t_{10} = 25.6$ | 1.78472 | 25.7 |
| | $r_{15} = -58.87$ | $s_5 = 14.34$ | | |
| $L_{11}$ | $r_{16} = -40.74$ | $t_{11} = 3.40$ | 1.51692 | 64.0 |
| | $r_{17} = -58.16$ | $s_6 = 15.84$ | | |
| $L_{12}$ | $r_{18} = -49.97$ | $t_{12} = 3.47$ | 1.51692 | 64.0 |
| | $r_{19} = -79.29$ | $s_7 = 18.11$ | | |
| $L_{13}$ | $r_{20} = -50.53$ | $t_{13} = 5.74$ | 1.51010 | 63.3 |
| | $r_{21} = -89.84$ | | | |

What is claimed is:

1. A wide angle objective comprising two converging components with the diaphragm position between them, two single diverging meniscus lenses concave towards the diaphragm position at the object side of the converging components and separated on the axis by an air space within the range of 0.5 and 1.5 times the air space on the axis between the adjacent converging component and the meniscus lens nearer thereto, and two single diverging meniscus lenses concave towards the diaphragm position at the image side of the converging components and separated on the axis by an air space within the range of 0.5 and 1.5 times the air space on the axis between the adjacent converging component and the meniscus lens nearer thereto, the converging component which is located towards the object having near the diaphragm position a cemented surface concave towards the diaphragm position, of converging power and with a radius of curvature within the range of $0.10f$ to $0.60f$, where $f$ is the focal length of the complete objective.

2. A wide angle objective with an angle of view of about 120° and more, comprising two converging components with a diaphragm position between them, the focal length of each converging component being greater than $0.30f$ and smaller than $2f$ and the stronger curved outer surfaces being convex and turned away from the diaphragm position, at least two diverging menisci components concave towards the diaphragm position at the object side of the converging components and at least two further diverging menisci components concave towards the diaphragm position at the image side of the converging components, the axial distance between the several menisci components on the object side as well as on the image side being greater than $0.04f$ and smaller than $0.6f$, the converging component at the object side of the diaphragm position containing a cemented surface positioned next to and concave towards the diaphragm position at a distance from the next outer lens surface turned towards the diaphragm position less than $0.20f$ and greater than $0.01f$ and the refractive index on the object side of said cemented surface being smaller than that on the side facing the diaphragm position and the radius of curvature of said cemented surface lying within the range of $0.10f$ to $0.60f$, and a further cemented surface in the converging component at the image side of the diaphragm position, said further cemented surface being concave towards the image with a refractive index on the object side thereof being at least 0.020 smaller than that on the image side and the radius of curvature of said further cemented surface being longer than that of the cemented surface in the converging component positioned on the object side of the diaphragm position, $f$ denoting the focal length of the complete objective.

3. A wide angle objective with an angle of view of about 120° and more, comprising two converging components with a diaphragm position between them, the focal length of each converging component being greater than $0.30f$ and smaller than $2f$ and the stronger curved surfaces being convex and turned away from the diaphragm position, two diverging meniscus components concave towards the diaphragm position at the object side of the converging components and two further diverging meniscus components concave towards the diaphragm position at the image side of the converging components, said two diverging components and said two further diverging components being separated, respectively, on the axis by an air space within the range of 0.5 and 1.5 times the air space on the axis between the adjacent converging component and the meniscus component nearer thereto, the converging component at the object side of the diaphragm position containing a cemented surface positioned next to and concave towards the diaphragm position at a distance from the outer lens surface turned towards the diaphragm position less than $0.20f$ and greater than $0.01f$ and the refractive index on the side of the cemented surface facing the object being smaller than that on the side facing the image and the radius of curvature of said cemented surface lying within the range of $0.10f$ to $0.60f$, and a further cemented surface in the converging component at the image side of the diaphragm position, said further cemented surface being convex towards the diaphragm position with a refractive index on the side of the further cemented surface facing the object being at least 0.020 smaller than that on the side facing the image, and the radius of curvature of said further cemented surface being longer than that of the cemented surface in the converging component positioned on the object side of the diaphragm position, $f$ denoting the focal length of the complete objective.

References Cited in the file of this patent

UNITED STATES PATENTS

| | | |
|---|---|---|
| 2,721,499 | Bertele | Oct. 25, 1955 |
| 2,734,424 | Bertele | Feb. 14, 1956 |